Aug. 7, 1934. W. P. HERMAN 1,969,006
FRUIT JUICE EXTRACTOR
Filed Oct. 10, 1930 2 Sheets-Sheet 1

INVENTOR.
W. P. Herman
BY
ATTORNEY.

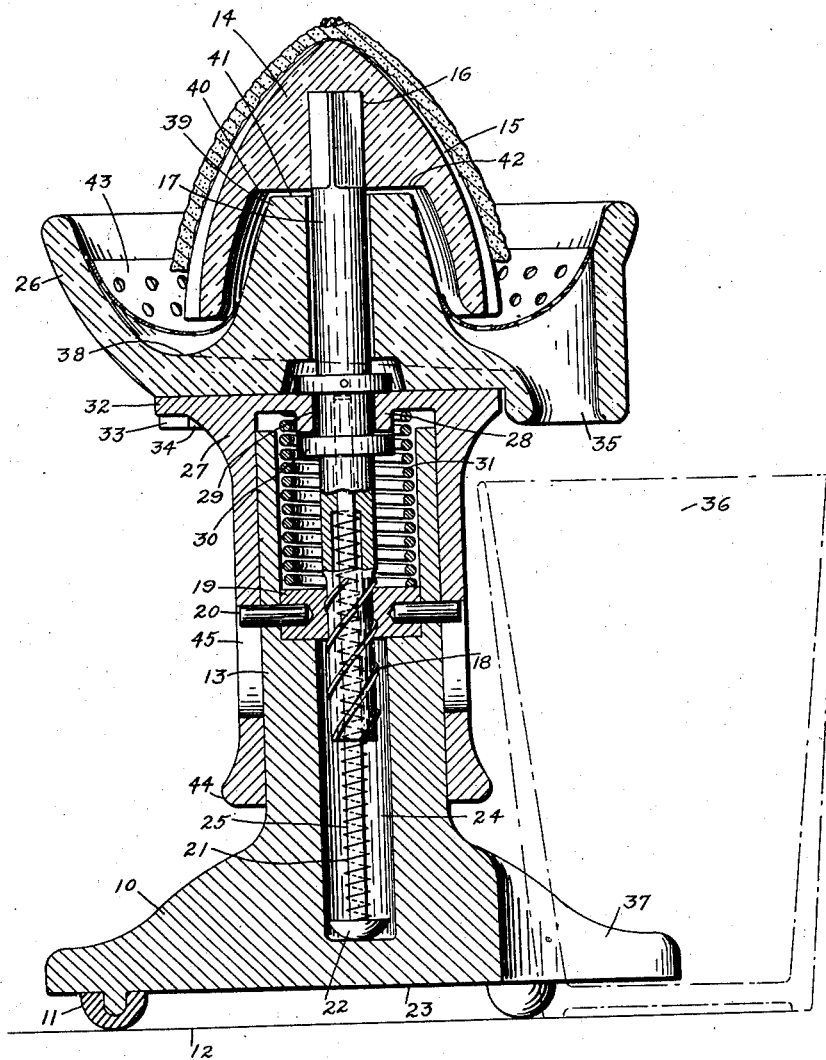

Patented Aug. 7, 1934

1,969,006

UNITED STATES PATENT OFFICE 1,969,006

FRUIT JUICE EXTRACTOR

William P. Herman, Bridgeport, Conn.

Application October 10, 1930, Serial No. 487,845

15 Claims. (Cl. 146—3)

This invention relates to fruit juice extractors and the like, and particularly to apparatus for removing juice from citrus fruits.

In the patent to Enssle, No. 1,634,774, granted July 5, 1927, there is disclosed a juice extractor for citrus fruits, comprising a bowl mounted on a base and having an extractor head movable longitudinally with relation to the bowl and adapted to rotate as an incident to said longitudinal movement when a piece of fruit held in the hand of the user is pressed down on the extractor head. In said patent, the bowl portion was made relatively high so as to catch any juice which might be thrown outwardly by the extractor head in its operation in all of its positions vertically, and this necessitated the user actually putting his hand into the bowl when extracting juice from a piece of fruit held thereby.

An object of the present invention is to provide a juice extractor in which the bowl rises and falls with the corresponding movement of the extractor head so that the sides of the bowl are always in position to catch the juice thrown off from the extractor head by centrifugal force without necessitating the making of the sides of the bowl so high that the operator's hand must necessarily enter the bowl and allow his arm to be held substantially horizontally while applying the fruit to the extractor head. Thus, this invention not only provides for greater convenience in the operation of the device, but also effects a saving in its cost by permitting a smaller and more shallow bowl to be used.

In said Enssle patent aforesaid, the entire force for rotating the extractor head is derived from the pressure of the piece of fruit applied to the extractor head, while at the same time said pressure tends to resist rotation of the extractor head. In practice, it has been found that, except occasionally as when the piece of fruit has little juice, or a tough pulp, the pressure does not substantially resist rotation. However, when on occasion it does so, it effectually prevents the successful operation of the device, and it is necessary then for the user to rotate the fruit on the extractor in order to remove what juice there may be.

Accordingly, another object of this invention is to provide means for facilitating the rotation of the extractor head without depending solely upon the pressure applied thereto by the piece of fruit. In the specific embodiment of this invention illustrated herein, this is accomplished by providing means adapted to be manually engaged to rotate the extractor head independently of the pressure applied thereto by the piece of fruit. This may be accomplished in two ways, according to the present invention: either by the pressure applied to the bowl by the user's hand holding the piece of fruit against the extractor head, the bowl moving longitudinally with the extractor head as above stated; or by a sleeve or other suitable means which may be engaged by the free hand of the user, while the other hand is holding the piece of fruit against the extractor head with just sufficient pressure to cause the juice to be extracter without materially retarding its rotation.

With the provision of these auxiliary operating means, a sharper or more rasping extractor head may be employed than was otherwise possible, thus permitting the juice to be extracted more rapidly under normal conditions, and more satisfactorily under abnormal conditions.

Other features and advantages will hereinafter appear.

In the accompanying drawings which illustrate one form of this invention, that at present preferred:

Fig. 2 is a similar view showing the extractor head and catch bowl at the lower limits of their movements.

Figure 1:
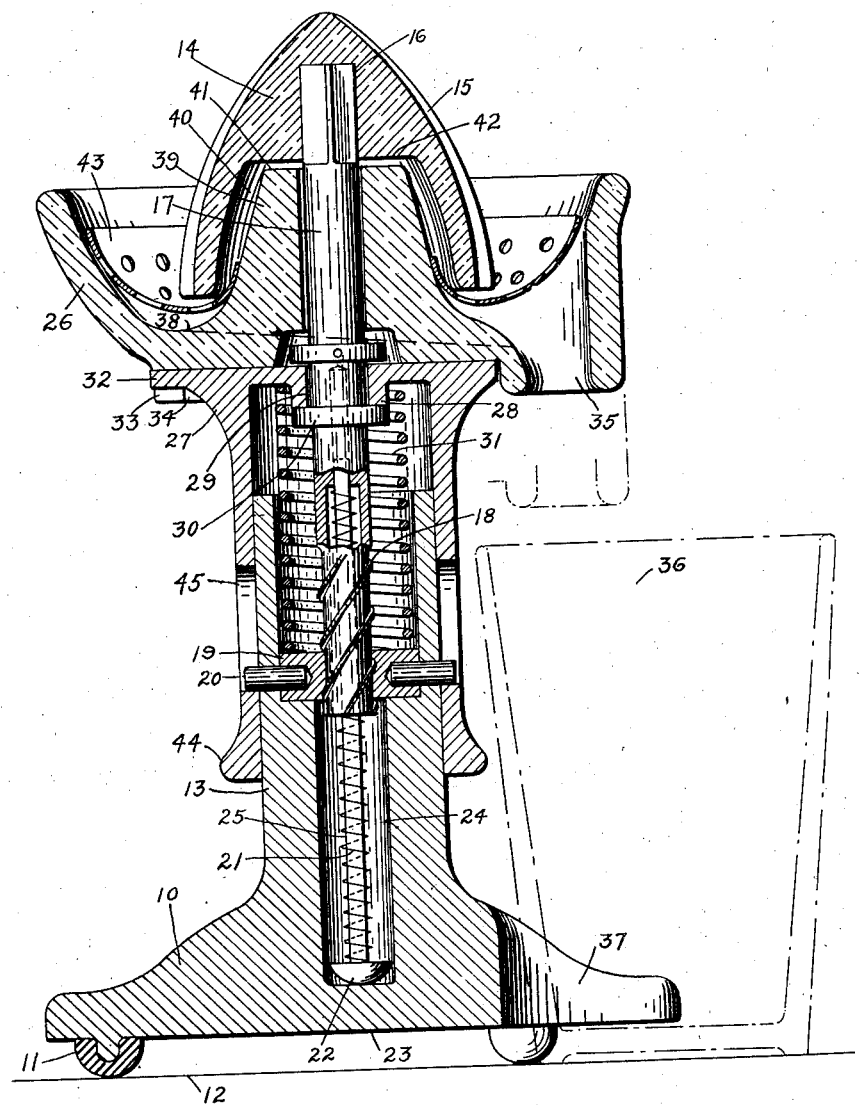
Figure 1 is a vertical sectional view of the juice extractor, showing the parts in their normal idle position.

As shown in the accompanying drawings, the device of the present invention comprises a base 10 having feet 11 by means of which it may be supported on a flat surface 12 or a table or the like. The base 10 has a standard 13 rising therefrom on which the operating parts of the device are mounted.

At its upper end, the device has an extractor head 14, preferably made of glass or ceramic material, and is substantially ogival to fit within a half of a citrus fruit.

The extractor head 14 is provided with ribs or protuberances 15 adapted to crush the juice cells of the fruit so that the juice may be liberated and flow downwardly on the extractor head. The extractor head is provided with a non-circular hole 16 to receive a similarly shaped end of an operating shaft 17.

This shaft at its lower end is provided with screw-like helical grooves and flutes 18 engaging a similarly internally shaped nut 19 secured to the standard 13 by pins 20. The shaft 17 is normally held elevated by a spring 21, the upper end of which is located in a hollow portion of the shaft 17 while the lower end engages a button 22 resting on the bottom 23 of a chamber 24 in the base. The button 22 is secured to a rod 25 which extends upwardly through the spring to hold it straight against buckling during compression and expansion. Since the nut 19 is held against rotation relative to the standard 13, longitudinal movement of the rod 17 within the standard will cause the rod and extractor head 14 carried thereby to be rotated in one direction as the extractor head is depressed, and in the reverse direction as it rises under the influence of the spring 21.

Instead of being mounted stationarily with relation to the base 10 and standard 13, the means for catching the juice as it runs off the fruit and extractor head 14 is, according to this invention, mounted to reciprocate with the extractor head for the purposes and with the advantages above referred to.

Hence, in the form of the invention illustrated herein, a catch bowl 26 is supported on a sleeve 27 slidably fitting over and telescoping with the standard 13 of the device so that it may move vertically thereon. To insure this vertical movement of the bowl with the extractor head, the upper end of the sleeve 27 is provided with an end 28 having an aperture 29 through which the operating rod 17 extends, and on each side of this end 28, the operating rod 17 has fixed to it a collar 30.

When downward pressure is brought upon the rod 17 through the extractor head, the upper collar engaging the end 28 of the sleeve forces the sleeve and the bowl 26 carried thereby downwardly. Conversely when the operating rod 17 rises, the lower collar 30 causes the sleeve to rise with it, engaging the underside of the end 28.

With this arrangement, the spring 25 could be made to return both the sleeve and bowl, and rod 17, and extractor head, but it is preferable to provide an additional spring 31 between the sleeve and the base so as to reduce, as much as possible, the friction between the collars 30 and the margins of the hole 29.

According to the present invention, the sleeve 27 may be permanently secured to the bowl 26, but preferably, the bowl merely rests on the top of the end portion 28 of the sleeve so that it can be removed for cleaning purposes. Accordingly, the end 28 of the sleeve 27 may be provided with a lug 32 engaging a notch 33 in the bottom rim 34 of the bowl 26 to prevent it from turning, and also to so locate the bowl that the outlet aperture 35 of the bowl will lie above a tumbler or other receptacle 36 into which the juice extracted from the piece of fruit and collected by the bowl may drop.

The base 10 preferably has a cut-out 37 in which which the tumbler 36 may extend to properly locate the same with relation to the outlet aperture 35 of the bowl 26.

The bowl 26 may have any suitable or desired shape, but preferably, is circular and approaches the shape of a deep saucer except for the fact that at one point it is provided with the outlet aperture 35, and that its bottom surface 38 at a point opposite this aperture, i. e., at the left-hand side in Fig. 1, is higher than at other points about the bowl, and this surface 38 is inclined, as indicated in dotted lines in Fig. 1, so that the juice collected by the bowl will quickly run to the point at which the outlet 35 is located, and from the latter be discharged into the receptacle 36. The bowl 26 also differs from an ordinary saucer by having centrally located a raised hub-like portion 39 through which the operating rod 17 extends, and which prevents the juice extracted from flowing down along the rod 17 to the mechanism within the device. For this purpose, the extractor head 14 is provided with a chamber 40 into which the hub-like portion 39 of the bowl extends.

By arranging for the vertical movement of the bowl 26 with the extractor head 14, it is possible to have the upper surface 41 of the hub portion 39 in close proximity to the end wall 42 of the chamber 40 in the extractor head, and these two surfaces could contact except for the undesirable feature of having these glass or ceramic surfaces rubbing against each other. This arrangement, it will be noted, permits the hub 39 to be much higher and to have a greater overlap with the extractor 14 than is possible where the extractor head moves vertically with relation to the bowl, thereby obviating the danger of the fruit juices being splashed or seeping into the mechanism of the device.

The hub portion 39 of the bowl may carry a sheet-metal or other suitable strainer 43 to collect fruit seeds and any pieces of pulp which may be removed from the fruit by the extractor head.

In employing the device, the user places a half of orange, lemon, or other citrus fruit, in his hand and applies it to the extractor head 14, pressing downwardly. This causes the rod 17 to be rotated as it and the bowl 26 descends, the rotation of the extractor head causing the ribs 15 thereof to crush the juice cells of the fruit and liberate the same for collection by the bowl 26 and discharge into the receptacle 36. Then the pressure is relieved and the fruit, extractor head and bowl rise under the influence of the spring 21, and the extractor head turns and still further liberates the juice of the fruit. This vertical reciprocating movement is continued until the juice has been extracted from the piece of fruit.

Occasionally, a fruit may be relatively dry, that is, contain little juice, and may have a tough pulp. In such cases, the juice liberated seems not to sufficiently lubricate the extractor head to permit it to turn under the downward pressure applied by the fruit. When this occurs, automatic operation of the device may be assisted by the operator bearing down upon the bowl with the same hand that holds the fruit, thus reducing friction between the fruit and the extractor head. If the other hand of the operator is free, it is more convenient that the operator grasp the sleeve 27 with his free hand and aid the reciprocation of the extractor head and bowl in this way; the sleeve 27 being provided with a bead 44 at its lower end so that the operator's hand will not readily slip down off the sleeve.

This manual operation may be performed even with fruit of ordinary quality, in which case both the pressure of the fruit on the extractor head and the downward pulling by hand engagement with the sleeve 27 will greatly improve the speed and ease of operation of the device.

The vertical movement of the sleeve 27 on the standard 13 may be limited by the pins 20 which hold the nut 19 in operative position, for, as shown, these pins 20 may extend through longitudinal slots 45 at opposite sides of the sleeve.

It will be noted that in the device of the present invention, the bowl 26 is spaced substantially from the base 10, and that the standard 13 and sleeve 27 are sufficiently small in diameter to be conveniently grasped by one hand so that the device may be carried from place to place, for instance from the cupboard to the table for use with ease and facility.

Variations and modifications of the invention, may be made within the scope of this invention, and portions of the improvements may be used without others.

Having thus described the invention, what is claimed as new and for which it is desired to obtain Letters Patent, is:—

1. A fruit juice extractor having a base; an extractor head; means for mounting the extractor head for vertical movement; means for causing the extractor head to rotate as an incident to said vertical movement; a catch bowl for collecting the juice extracted by the extractor head; and means connected to the catch bowl and depending therefrom for vertical reciprocatory movement on the base, said bowl and extractor head being interconnected to reciprocate together.

2. A fruit juice extractor having a base; an extractor head; means for mounting the extractor head for vertical movement; means for causing the extractor head to rotate as an incident to said vertical movement; a catch bowl for collecting the juice extracted by the extractor head; and means for mounting the catch bowl on the base for solely vertical reciprocatory movement with the vertical and rotating movements of the extractor head.

3. A fruit juice extractor having a base; an extractor head; means for mounting the extractor head on the base for vertical movement; means for causing the extractor head to rotate as an incident to said vertical movement; and a catch bowl mounted on the base for solely vertical reciprocatory movement, and adapted, when pressure is brought to bear thereon, to operate the means for causing the extractor head to rotate as it moves vertically.

4. A fruit juice extractor having a base; an extractor head; means for mounting the extractor head on the base for vertical movement; means for causing the extractor head to rotate as an incident to said vertical movement when pressure is brought to bear on the extractor head by a piece of fruit held in the hand of the user; and a catch bowl for collecting the juices extracted by the extractor head mounted for independent vertical reciprocatory movement on the base with the extractor head.

5. A fruit juice extractor having a base; an extractor head; means for mounting the extractor head on the base for vertical movement; means for causing the extractor head to rotate as an incident to said vertical movement; a catch bowl for collecting the juices extracted by said extractor head; and means slidably mounted on the base for supporting the catch bowl and causing the same to reciprocate vertically with the extractor head.

6. A fruit juice extractor having a base; a standard rising from the base; an extractor head; means for mounting the extractor head on the standard for vertical movement; means for causing the extractor head to rotate as an incident to said vertical movement; a catch bowl for collecting juices extracted by the extractor head; a sleeve slidably mounted on the standard and adapted to be manually engaged; and means connecting the sleeve to the extractor head to cause the extractor head to be moved vertically by the sleeve when the latter is moved by hand.

7. A fruit juice extractor having a base; an extractor head; means for mounting the extractor head on the base for vertical movement; means for causing the extractor head to rotate as an incident to said vertical movement when pressure is brought to bear on the extractor head by a piece of fruit held in the hand of the user; a catch bowl for collecting the juices extracted by the extractor head mounted for vertical reciprocatory movement on the base with the extractor head; and means interconnecting the catch bowl and the extractor head so that the extractor head may be moved vertically and caused to rotate by pressure applied to the catch bowl.

8. A fruit juice extractor having a base; an extractor head; means for causing the rotation and descending movement of the extractor head when pressure is brought to bear thereon by a piece of fruit held in the hand of the user; and manually engageable means including a sleeve having straight line reciprocatory movement on the base associated with the first-named means yet capable of causing the extractor head to descend and rotate independently of pressure applied to the first-named means.

9. In a fruit juice extractor, a base; a cylindrical standard rising from the base and having a cavity opening at its upper end; a nut supported in the cavity; an extractor head; a rod carrying the extractor head at its upper end and having helical threads at its lower end engaging said nut; a sleeve slidably mounted on the external surface of said cylindrical standard and having an aperture at its upper end through which the extractor head rod extends; and means interconnecting said sleeve and said extractor head rod for vertical movement together relative to the standard and base.

10. In a fruit juice extractor, a base; a cylindrical standard rising from the base and having a cavity opening at its upper end; a nut supported in the cavity; an extractor head; a rod carrying the extractor head at its upper end and having helical threads at its lower end engaging said nut; a sleeve slidably mounted on the external surface of said helical standard and having an aperture at its upper end through which the extractor head rod extends; means interconnecting said sleeve and said extractor head rod for vertical movement together relative to the standard and base; and a catch bowl supported by the upper end of said sleeve.

11. In a fruit juice extractor, a base; a cylindrical standard rising from the base and having a cavity opening at its upper end; a nut supported in the cavity; an extractor head; a rod carrying the extractor head at its upper end and having helical threads at its lower end engaging said nut; a sleeve slidably mounted on the external surface of said helical standard and having an aperture at its upper end through which the extractor head rod extends; means interconnecting said sleeve and said extractor head rod for vertical movement together relative to the standard and base; a catch bowl supported by the upper end of said sleeve; and means normally urging the sleeve and extractor head rod upwardly.

12. In a fruit juice extractor, a base; a cylindrical standard rising from the base and having a cavity opening at its upper end; a nut supported in the cavity; an extractor head; a rod carrying the extractor head at its upper end and having helical threads at its lower end engaging said nut; a sleeve slidably mounted on the external surface of said helical standard and having an aperture at its upper end through which the extractor head rod extends; means interconnecting said sleeve and said extractor head rod for vertical movement together relative to the standard and base; a spring for normally urging the extractor head rod upwardly; and another spring for normally urging the said sleeve upwardly.

13. In a fruit juice extractor, a base; a cylindrical standard rising from the base and having a cavity opening at its upper end; a nut supported in the cavity; an extractor head; a rod carrying the extractor head at its upper end and having helical threads at its lower end engaging said nut; a sleeve slidably mounted on the external surface of said helical standard and having an aperture at its upper end through which the extractor head rod extends; and collars on said extractor head rod engaging the margins of the aperture in the sleeve through which the extractor head rod extends for causing the extractor head and sleeve to move vertically in unison.

14. In a device of the character described, a base member, a tubular member supported by the base member, a telescoping member associated with the first named member, a reamer member associated with the upper end of the telescoping member, a cup member supported by the upper end of the telescoping member for collecting and retaining juice extracted by the reamer, means housed within the telescoping member and extending longitudinally thereof, said means cooperating with means in the tubular member for rotating the reamer member incidental to reciprocatory movement of the reamer and cup due to pressure acting on the reamer member.

15. A fruit juice extractor comprising a base, a cylindrical casing rising therefrom, a sleeve telescopingly mounted on said cylindrical casing, a bowl having an axial opening therein supported at the upper end of said sleeve, a cylinder extending through the sleeve and the opening in the bowl, a spring normally holding the sleeve and cylinder in extended position with relation to said casing, said cylinder being mounted for reciprocatory movement into the casing, stationary means in the casing cooperating with the cylinder to effect rotation thereof as it is reciprocated, and a reamer removably mounted on the upper end of the cylinder and rotating therewith.

WILLIAM P. HERMAN.